J. R. SEES.
Lubricators.
No. 5,737. Reissued Jan. 20, 1874.
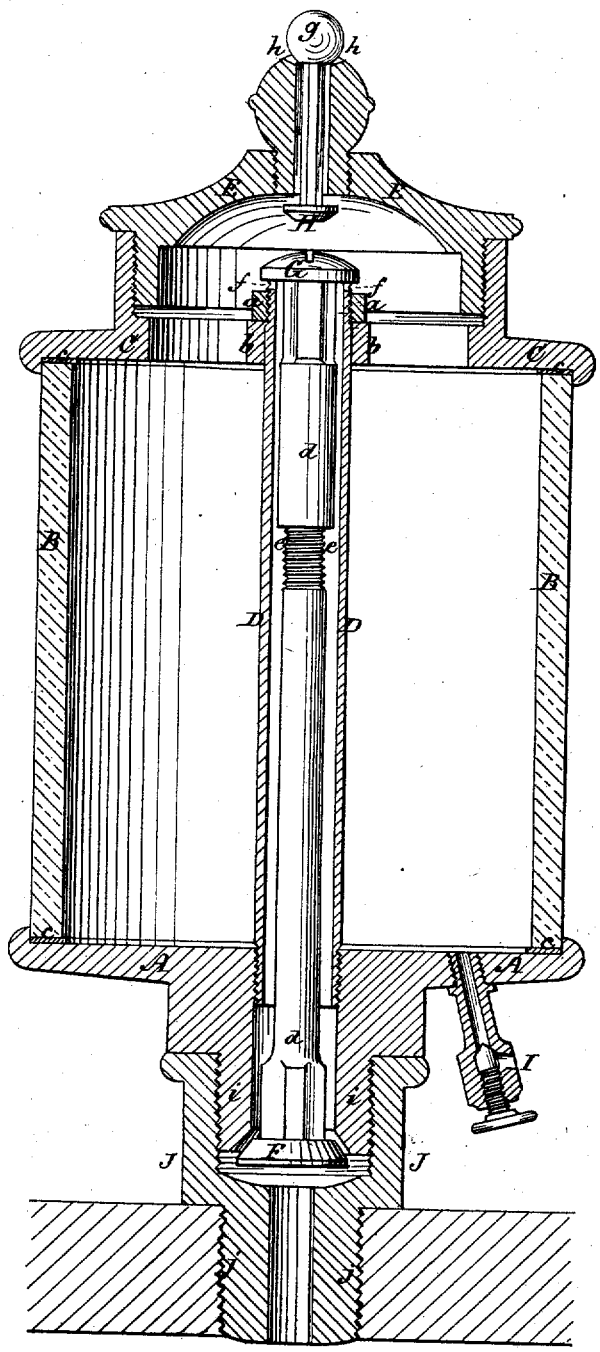
Witnesses.
Ewell Dick.
Wm. E. Shaffer
Inventor: J. R. Sees. Assignees -
Max Nathan
Raphael Dreyfous
Isidore Dreyfous
by atty A. Pollokey
AM. PHOTO-LITHOGRAPHIC Co. N.Y. (OSBORNE'S PROCESS.)

UNITED STATES PATENT OFFICE.

JOHN R. SEES, OF PHILADELPHIA, PENNSYLVANIA, ASSIGNOR, BY MESNE ASSIGNMENTS, TO NATHAN & DREYFUS, OF NEW YORK CITY.

IMPROVEMENT IN LUBRICATORS.

Specification forming part of Letters Patent No. 40,433, dated October 27, 1863; antedated October 10, 1863; reissue No. 5,737, dated January 20, 1874; application filed November 29, 1873.

*To all whom it may concern:*

Be it known that JOHN R. SEES, of the city of Philadelphia, in the State of Pennsylvania, has invented a new and Improved Lubricator for Locomotive and Steam-Engines; and the following is hereby declared to be a full, clear, and exact description of the same, reference being had to the accompanying drawings forming a part of this specification, said drawing representing a central vertical section of the lubricator.

The invention may be generally stated as follows: It consists in combining within the cup of a lubricator for steam-engines a supply-tube and a regulating-valve, adapted to be operated by differences in the pressure of steam in the valve-chest or other part to which said lubricator is applied, to admit steam through the tube into the lubricator, and to permit the passage from the lubricator through the tube of the oil or grease displaced by the condensation of said steam, as hereinafter described. It further consists in uniting the top and the base of the lubricator, by means of an interior central tube constituting at the same time the only channel by which the lubricant can be conveyed from the cup to the parts requiring lubrication, as hereinafter described. It further consists in combining with the oil-cup or vessel that contains the lubricating material, an atmospheric valve or air-vent, operating at the proper time to admit air from the outside to the interior of said cup.

The accompanying drawing, which will now be referred to, is an embodiment of all the several features of the above invention above stated.

A B C is the cup, composed of a thick cylinder, B, of glass, constituting the body, and a base, A, and top C of brass, but it may be made entirely of brass. The parts A, B, and C are held together by an interior connection entirely within the body of the reservoir, here represented as consisting of a central tube, D, and a nut, *a*, the central tube screwing tightly into a hole in the bottom A, and passing through a fixed bridge, *b*, formed across the top C, and the nut *a* being screwed onto the tube above the bridge *b*, and brought down tight upon the bridge. A vulcanized india-rubber or other soft packing, *c*, is used between A, C, and B. The top C is fitted with a movable cap, E, to provide for the filling of the cup with oil or tallow. F is a valve on a stem, *d*, passing through the tube D, and fitted to a conical seat in the bottom A of the cup, and closing in an upward direction. The stem terminates in a head, G, resting normally on the top of the tube D. The stem *d* is made in two pieces, screwed together at *e*, to provide for its being lengthened or shortened, and thereby regulating the amount of movement of the valve. The valve F fits perfectly tight to its seat when closed, but the end of the tube D, on which head G rests, is notched, as shown at *f f*, so that the said tube at that point is never perfectly closed, the office of said head G being to serve as a stop to regulate the opening movement of the valve F, and so prevent the oil or tallow from running into the tube D, as it is being poured into the cup. Were it not required to serve the latter purpose, the upper part of the stem might simply be furnished with lugs, or have a pin inserted transversely through it, as a substitute for the head G. H is a valve, which has been above referred to as the atmospheric valve or air-vent, fitted into the cap E, and closing with an upward movement. This valve has a stop, *g*, at the top of its stem, to limit its opening movement, but the top of the cap is so notched, externally, as shown at *b b*, that the said stop does not close the opening therein when the valve drops. I is a cock in the bottom of the cup, for emptying it. J is a socket, which has screwed into it a nozzle, *i*, provided on the bottom A of the cup, and which is itself provided with a nozzle, *j*, to be screwed into a tapped hole in the steam-chest, or other part requiring lubrication.

To set the cup in operation, when used for cylinders or steam-chests, it is filled with oil or tallow up to the level of the top of the tube D. While the steam-chest is open to the boiler and filled with steam, the pressure of the steam keeps the valve F closed, but the valve H is kept open by the pressure of the atmosphere, aided by its own weight.

Whenever, in the running of the engine, the steam is shut off from the steam-chest, the valve F drops by the reason of its own weight and the weight of the stem *d*. When steam is again admitted to the steam-chest it closes the valve F again, but before it can close the valve some steam escapes through the tube D into the upper part of the cup, and closes the valve H, which prevents its escape from the cup. This steam being shut into the cup by the closing of the valve soon condenses, and the water of condensation sinks below the grease, which floats on its surface, and rises above the level of the tube D, down which it flows by gravitation, remaining in the said tube or the passage in the bottom A below it, until the steam is again shut off, when the valve F being again opened the grease runs into the steam-chest. The valve H opens when the steam has been condensed or partially condensed in the upper part of the cup, and so admits the pressure of the atmosphere upon the grease at all times, except when the steam is uncondensed in the cup, it being desirable to catch or trap all the steam admitted to the cup, as it is by the water resulting from the condensation of such steam that the grease is raised above the level of, and caused to flow into the feed-openings in, the tube D. If in the ordinary running of the engine the steam is not shut off as often as it is desirable to lubricate the valve, the lubrication may be effected by simply shutting off and letting on the steam again quickly.

The quantity of oil supplied at at a time is regulated by the quantity of steam admitted to the cup, and this is regulated by the amount of movement permitted to the valve F by the adjustment of the stem at *e*, a longer movement not allowing the valve F to close so quickly when steam is admitted to the steam-chest, and so allowing more steam to pass into the cup, and a shorter movement allowing the said valve to close more quickly, and less steam to pass into the cup. This operation continues so long as any grease remains in the cup, the grease floating on the top of the water as the cup fills up with the latter. When all the grease is out, which may be easily seen when the body B of the cup is made of glass, the water is drawn off by opening the cock I, and the cup is refilled with grease by taking off the cap E, and pouring in the lubricant, and the lubricator can be applied to any part, such as a steam-chest, cylinder, crank-pin, or connecting-rod requiring to be lubricated.

The independent screw-socket J enables the cup to be adapted to any part requiring lubrication. The screw-thread on the nozzle *j* of this socket need not be cut until the cup is to be applied, when the socket may be chucked in a lathe, and the said thread be cut to fit any hole that may be tapped in the steam-chest or other part for its reception, and the cup can thus be fitted in place without putting it in a lathe and running the risk of breaking the glass, or otherwise injuring or marring it.

What is claimed as the invention of the said JOHN R. SEES is as follows:

1. In a lubricator for steam-engines, the combination, substantially as described, of a supply or feed tube and a regulating-valve, adapted to be operated by differences in steam-pressure, to admit steam through the tube into the lubricator, and to permit the passage from the lubricator through the same tube of the oil or grease displaced by the condensation of said steam.

2. The central feed or supply tube, fast to and extending from the bottom, and united with the top of the lubricator by an interior connection, substantially as shown and described.

3. A lubricating cup or vessel, composed of a glass cylinder or body, a metallic top and bottom, and a central tube extending between and uniting said bottom and top, and constituting at the same time the sole channel through which the lubricant is fed from the cup, substantially as shown and described.

4. The combination of the feed or supply tube, the regulating valve and its stem, capable of being elongated or shortened to allow a greater or less movement to the valve, substantially as and for the purposes shown and set forth.

5. The combination, with the oil-cup or vessel, of the atmospheric valve or air-vent, operating at the proper time to admit air into the cup, substantially in the manner shown and described.

In testimony whereof, we have hereunto signed our name in the presence of two subscribing witnesses.

ISIDORE DREYFUS.
MAX NATHAN.
RAPHAEL DREYFUS.

Witnesses:
CHAS. JUDGE,
A. GUIEHARD.